INVENTOR.
ROGER N. LHERMITTE

INVENTOR.
ROGER N. LHERMITTE $V_h \cos \alpha$ BY POLAR COORDINATES

INVENTOR.
ROGER M. LHERMITTE

United States Patent Office 3,193,825
Patented July 6, 1965

3,193,825
ATMOSPHERIC MOTION NON-COHERENT
PULSE DOPPLER SYSTEM
Roger M. Lhermitte, Sudbury, Mass., assignor to the
United States of America as represented by the Secretary of the Air Force
Filed Mar. 5, 1963, Ser. No. 263,082
12 Claims. (Cl. 343—9)
(Granted under Title 35, U.S. Code (1952), sec. 266)

The invention described herein may be manufactured and used by or for the United States Government for governmental purposes without payment to me of any royalty thereon.

This invention relates to the measurement of horizontal motion in the atmosphere by means of pulse Doppler radar and more particularly by means of non-coherent pulse Doppler radar.

A copending application entitled, "Atmospheric Motion Coherent Pulse Doppler System," filed in the U.S. Patent Office on even date herewith, and bearing Serial No. 263,081, describes the many advantages that pulsed Doppler radar has in determining atmospheric motion over previous systems. That system is summarized briefly in the following paragraphs.

A radar situated upon the ground sends out pulses of energy. Echoes from droplets of moisture in the atmosphere return to the antenna that radiated the energy initially. Due to radial motion of the droplets with respect to the antenna a phase shift in the echo signal with respect to a coherent signal generated within the radar is measured.

This signal is analyzed for frequency content and displayed. A complete sweep of 360° (a complete revolution of the antenna) is displayed. The signal is gated and only motion of droplets contained within a phantom ring in space concentric with the radar and at a preselected altitude is shown.

Upon analysis, it can be shown that the display is made up of two distinct parts. One part is a sinusoidal variation and is the direct result of the force of wind. The other part is a constant value and is due to the vertical fall of the rain drops. The radial velocity toward the radar is therefore made up of a horizontal component due to wind and a vertical component due to rain.

The summation of the two curves that make up the display gives a curve that has two nulls and two maxima. These maxima have dissimilar values which is a measure of wind velocity.

The principles embodied in that invention are again exploited in the present invention but by different means. The present invention does not require the use of coherent radar.

Coherent radar systems are more costly and have inherent limitations. Stability of the coherent signal is very important and sensitivity must be sacrificed to maintain that stability.

Non-coherent radar on the other hand is much less costly and stability becomes relatively unimportant. Sensitivity therefore can be greatly increased. Attending an increase in sensitivity will ultimately be an ability to determine atmospheric motion from discontinuities in humidity and temperature between various layers of the atmosphere as opposed to the present ability to determine such motion from chaff clouds, rain, or snow.

An object of this invention is to provide a more sensitive system for determining atmospheric motion.

Another object of the invention is to provide radar means having dual beam antennas.

Another object of this invention is to provide method and means for mixing echo signals from the atmosphere to obtain information regarding atmospheric motion.

Another object of this invention is to provide method and means for demodulation Doppler echo signals from atmosphere to obtain information regarding atmospheric motion.

Another object of this invention is to provide a method of determining atmospheric motion from simple and inexpensive radar equipment.

Further objects of this invention will be more fully understood from the following detailed description when taken into consideration with reference to the accompanying drawings, wherein.

Figure 8:
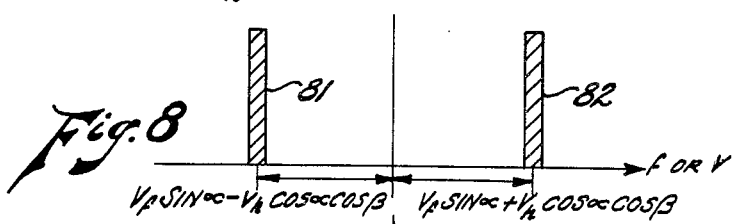

FIG. 8, the spectrum of frequency returns with respect to the transmitted signals from the atmosphere.

Figure 9:
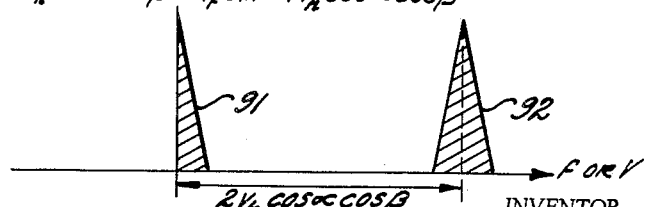

FIG. 9, the spectrum of frequencies as produced by the square law detector.

Figure 1:
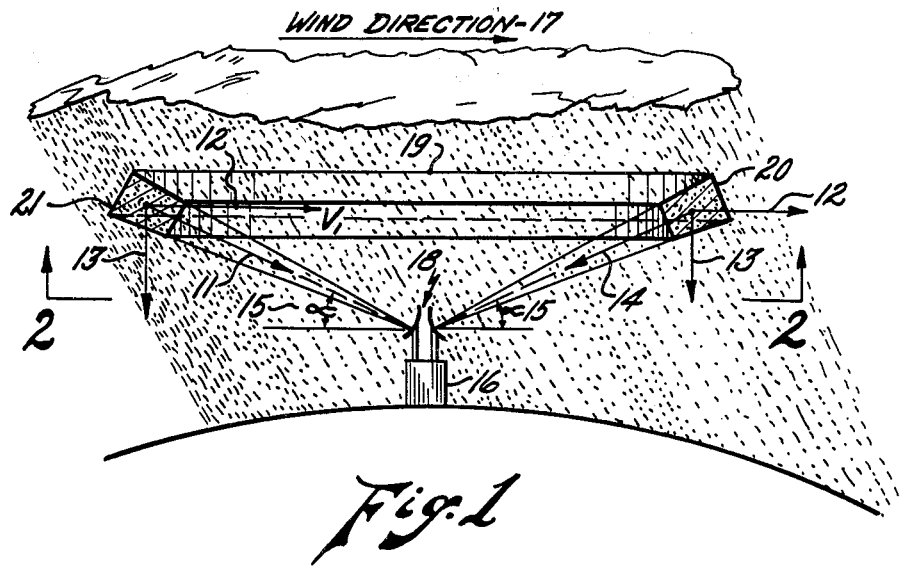
FIG. 1 shows a radar with dual antennas radiating and receiving echoes from the atmosphere.
Figure 2:
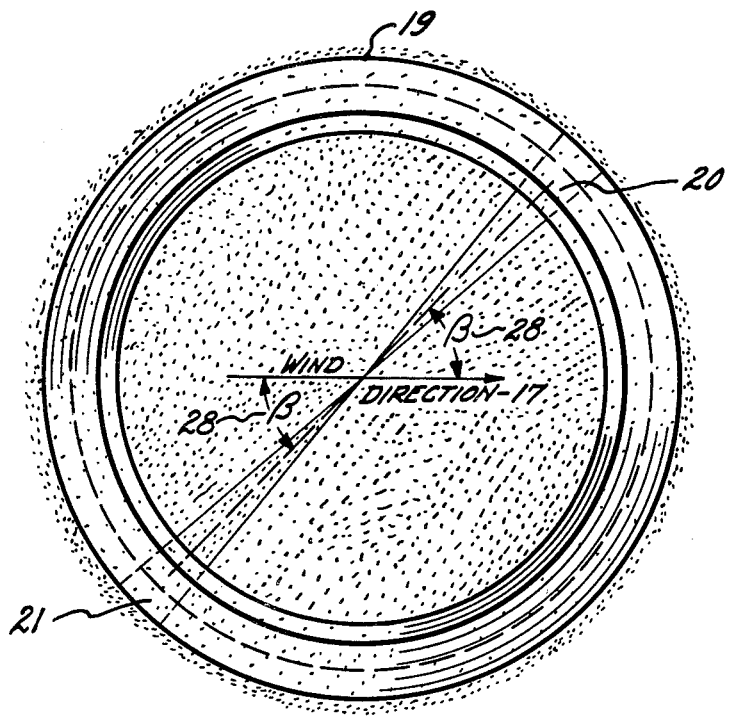
FIG. 2 shows a sectional view of FIG. 1 illustrating the angular relationship of the dual beams with the wind.

Referring to FIG. 1, radar 16 situated upon the ground transmits pulses of energy in two different directions simultaneously by means of dual antenna 18. Echoes from droplets of moisture within a preselected sector of space such as 20 and 21 return to radar 16. As antennas 18 rotate through one complete sweep of 360° a continuous series of pulses and their consequent echoes are generated and received by radar 16 such that droplets contained within phantom ring 19 produce a fairly continuous signal at radar 16.

Radar beams from both antennas are at preselected elevation angle $\alpha 15$. With rotation of the antenna these beams form similar angular relationship $\beta 28$ with wind direction 17. As will be explained more fully in subsequent paragraphs confining the beam to a constant angle of elevation $\alpha 15$ and gating the return echoes such that only signals from a given range are utilized then motion at an altitude related to that range and that elevation angle is considered. Furthermore, the motion of discrete segments of phantom ring 19 are also related to azimuth angle $\beta 28$.

It can be shown that the Doppler shift frequency of return echoes is related to the velocity of particles within the atmosphere and expressed by the formula $$f = \frac{2v}{\lambda}$$

wherein $f$ is the Doppler shift frequency, $v$ the velocity of a particle with respect to the radar, and $\lambda$ is the wavelength of the radar signal.

Vectors 14 and 11 represent motion of particles within the respective preselected volume of atmosphere 20 and 21. It is seen that these vectors are not the same although made up of identical vectors 12 and 13. Vector 12 is due to wind acting on the moisture droplets. Vector 13 is due to the vertical fall of the moisture particles. The preceding is predicated upon the assumption that the wind velocity and vertical fall are approximately uniform which is the usual case.

It is seen that vertical fall 13 gives a radical component to both radar echoes equal to $V_f \sin \alpha$; wherein, $V_f$ equals vertical fall velocity and $\alpha$ equals the angle of elevation 15 of the beams.

Additionally it is seen that horizontal motion of particles within cube 21 will impart a radical component to radical vector V equal to $V_h \cos \alpha \cos \beta$, wherein, $V_h$ is the horizontal motion of particles within the given cube and $\alpha$ is the elevation angle 15, $\beta$ is the azimuth angle 28 of the beam. On the other hand, it is seen that horizontal motion of particles within cube 20 impart a radial component to radial vector 14 equal to $$-V_h \cos \alpha \cos \beta$$

Up to this point we have been considering the velocity of particles within a given cube in atmosphere as having the same velocity. In practice this is not found. A spectrum of return echoes is found indicating that the particles have differing velocities grouped about some central value. This is due in large measure to the fact that a given cube will have a variety of different size particles. The vertical fall speed for rain will vary from 4 to 6 meters per second and for snow will vary from 1 to 2 meters per second. This spectrum presents no immediate problem and will be reviewed later in connection with other matters.

Figure 3:
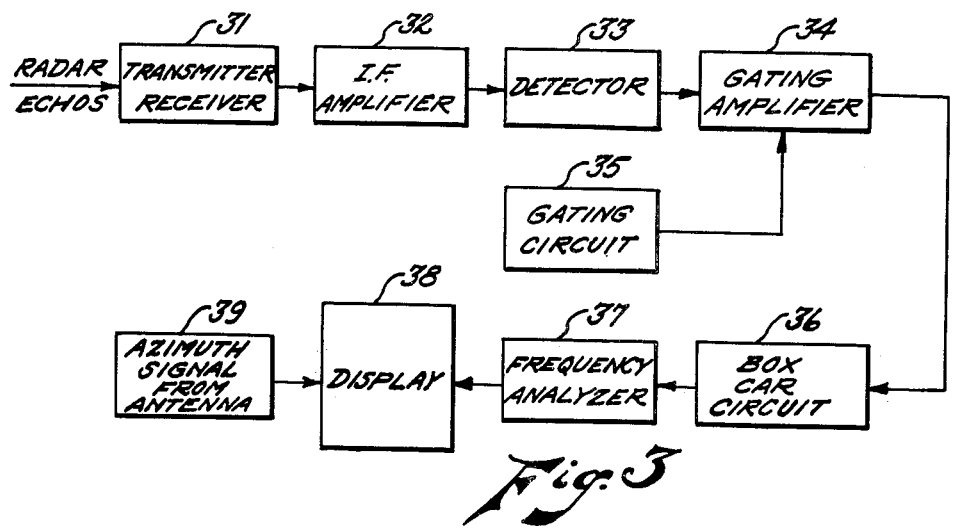
FIG. 3 is a block diagram of one embodiment of this invention.

Having received two radar echoes from the atmosphere, they are combined in a Y waveguide junction and applied to radar receiver 31, FIG. 3. Output of receiver 31 is fed to I.F. amplifier 32 and in turn to detector 33. Detector 33 is a square law detector.

Square law detector 33 reproduces the square of the envelope of the combined radar return signals. It can be demonstrated mathematically that this output is related to the motion of particles within the atmosphere. The output will have two distinct parts both readily distinguishable from one another. The first portion ultimately porduces curve 51, FIG. 5, while the second portion produces curve 52.

Output of detector 33 is applied to gating amplifier 34. Gating circuit 35 gates signals applied to gating amplifier 35 such that only signals corresponding to a prescribed range R are permitted to pass. Bearing in mind, angle of elevation $\alpha$ was held constant, then signals corresponding to an altitude equal to the product of the range and the sin of the angle alpha pass. Expressed by the formula $A = R \sin \alpha$; wherein, A equals altitude, R equals range, $\alpha$ equals the angle of elevation. These gated signals are then fed to boxcar 36.

Boxcar 36 stretches signals applied to it and its output is then analyzed for frequency content in frequency analyzer 37 and applied to display 38. The operation of these latter components are more fully discussed in the previously alluded to copending application concerned with a coherent radar system of measuring atmospheric motion. However, boxcar 37, well known in the art, produces rectangular stepped waveforms having a primary frequency corresponding to the Doppler shift frequency and an amplitude proportional to the amplitude of the echo at this frequency. Frequency analyzer 37 can be a parallel filter type similar to one called "Rayspan" produced by the Raytheon Manufacturing Company, or a panoramic or coherent memory filter type.

The output of frequency analyzer 37 is displayed on display 38 with respect to azimuth signals 39 generated at the antenna pedestal. The amplitude of the applied analyzed signal controls the intensity of the display, its frequency determines the vertical position of the trace. The azimuth signal controls the horizontal poistion of the trace. Display 38 can be an oscilloscope, an X-Y plotter or a polar coordinate plotter.

Figure 5:
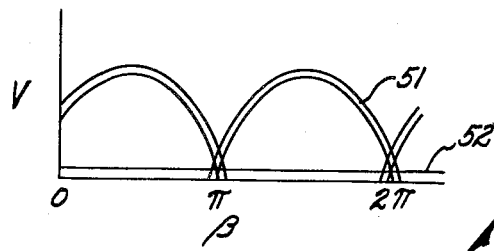
FIG. 5 shows a display in Cartesian coordinates of wind velocity with respect to azimuth angle of the antennas.

FIG. 5 shows a display that can be expected from the above processed signals. As pointed out earlier, two curves will be presented. The first is merely straight curve 52 and the second cosinusoidal curve 51. The central value of the spectrum as presented in 51 is given by the equation $2V_h \cos \alpha \cos \beta$ and contains the required information concerning horizontal wind velocity.

Curves 51 and 52 are attributable to the nature of the output of square law detector 33. This is shown graphically in FIGS. 8 and 9. FIG 8 shows the spectrum of two signals as they would appear when they return from the atmosphere. The central frequency or velocity of each signal is determined by the indicated equations. Spectrum 81 is determined by $$V_f \sin \alpha - V_h \cos \alpha \cos \beta$$

while, spectrum 82 is determined by $$V_f \sin \alpha + V_h \cos \alpha \cos \beta$$

When applied to the square law detector, the output as shown in FIG. 9 will appear. Spectrum 91 will correspond to curve 52 and spectrum 92 will correspond to curve 51. The width of spectrum 92 will be related to the widths of spectrums 81 and 82. The central value of spectrum 92 is determined by $$2V_h \cos \alpha \cos \beta$$

Figure 6:
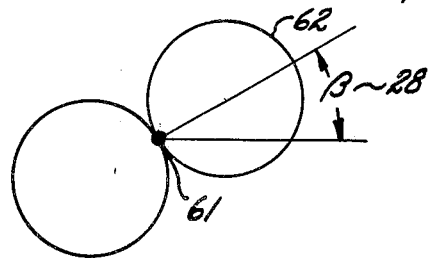
FIG. 6 shows the same pattern as above, but in polar coordinates.
Figure 7:
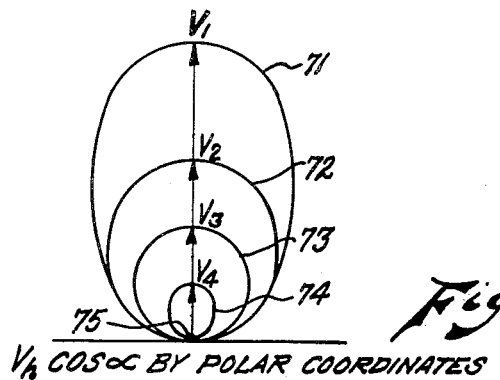
FIG. 7 shows a means for determining wind velocity from the display above in FIG. 6.

Owing to curve 52, zero points on curve 51 will be difficult to distinguish. This difficulty is eliminated by use of a polar coordinate display as shown in FIG. 6.

Spot 61 will correspond to curve 51. Curve 62 will correspond to curve 52. Angle $\beta 28$ is the azimuth angle. Radius of the circle 62 will determine horizontal velocity. A transparent plate has circles 71, 72, 73, 74 corresponding to different values of velocity etched on it, if caused to rotate at the azimuth speed in front of the screen, a rapid determination of wind velocity by comparison can be made.

Figure 4:
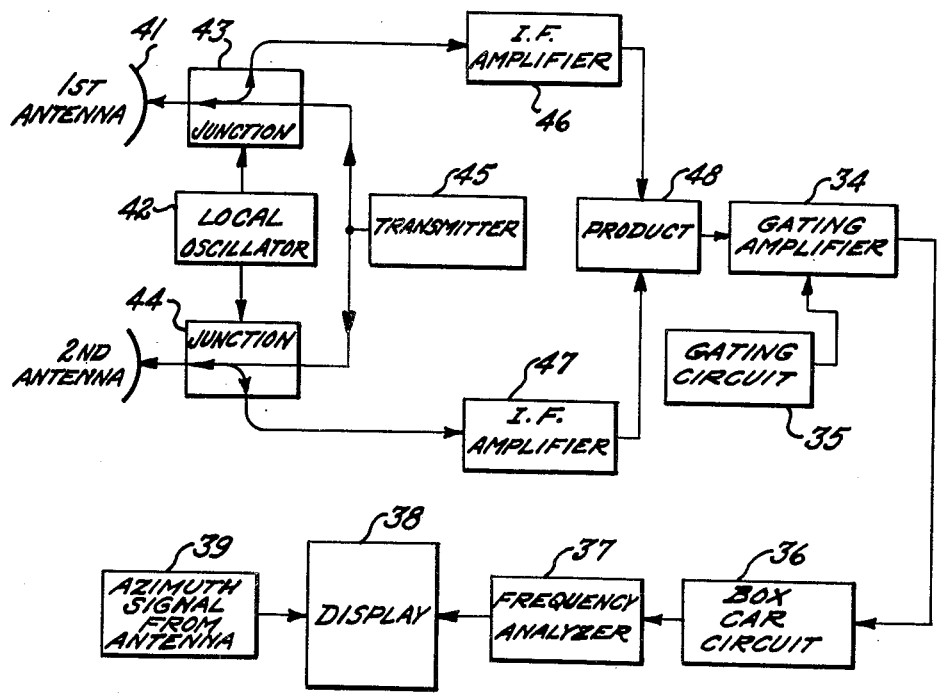
FIG. 4 is a block diagram of a second embodiment of this invention.

A second embodiment is shown in FIG. 4. The pulsed radar energy is divided up and transmitted via two separate antennas 41 and 42. Return echoes are relayed through the receiver to separate amplifiers by way of special junctions 43 and 44 respectively. Local oscillator 42 feeds into both junctions preserving the autocoherence contained within the echoes as previously described. The signals are amplified in I.F. amplifiers 46 and 47 respectively. The output of these amplifiers are then demodulated together in demodulator 48. The output of this circuit is proportioned to the two applied signals and more properly like the coherent type signal described in the earlier copending application than in the previous embodiment.

Phase demodulator 48 is preferably a true linear product device although an ordinary R.F. mixer will accomplish the desired result. The signal is then often treated similarly to that which is described in the above described embodiment when applied to the gating amplifier.

Throughout the above discussion, the antennas were oriented 180° apart. It is entirely possible to orient them at any fixed angle apart, 180° being a special case. However, any discussion or mathematical proofs of a signal not 180° apart will necessarily become a great deal more involved and complicated.

While I have described the above principles of my invention in connection with specific apparatus, it is to be clearly understood that such description is only made by way of example and not as a limitation on the scope of my invention as set forth in the objects thereof and in the accompanying claims:

What I therefore claim is:

1. Apparatus for determining atmospheric motion comprising radar transmitter means, dual antenna radiating means radiating energy from said transmitter means and receiving echoes from the atmosphere reflected back from falling moisture droplets intercepting said radiated energy, receiver means forming part of said radar means, amplifier means for amplifying said echoes, detector means for detecting the envelope of said amplified echoes, gating means for gating said detected signal at a preselected range, boxcar means for stretching said gated signals, frequency analyzer means for analyzing the frequency content of said stretched signals, azimuth signal generating means drivingly connected to said antenna means, display means for displaying said analyzed signals with respect to signals from said azimuth signal generating means.

2. Apparatus as described in claim 1 wherein said receiver means includes a Y junction for mixing the two return echoes.

3. Apparatus as claimed in claim 2 wherein said detector means is a square law detector.

4. Apparatus as described in claim 2 wherein said antennas are fixed 180° of azimuth angle apart.

5. Apparatus as claimed in claim 4 wherein said frequency analyzer means is a panoramic type filter.

6. Apparatus as claimed in claim 4 wherein said frequency analyzer means is a coherent memory filter type.

7. Apparatus as claimed in a claim 4 wherein said frequency analyzer means is a parallel type.

8. Apparatus as claimed in claim 7 wherein said display is an oscilloscope.

9. Apparatus as claimed in claim 7 wherein said display is an X–Y plotter.

10. Apparatus as claimed in claim 7 wherein said display is a polar coordinate plotter.

11. Apparatus as described in claim 10 wherein said linear product circuit means for reproducing the product of signals applied to it is an R.F. mixer.

12. Apparatus for determining atmospheric motion comprising radar means having two separate antennas with a fixed angular relationship in azimuth, junction means, said antennas connected to said junction means, local oscillator means connected to said junction means, said junction means feeding off echo signals reflected back from falling moisture droplets and received from the antenna respectively connected thereto together with the output of said local oscillator means to separate amplifier means, linear product circuit means, said separate amplifiers connected to said linear product means such that the product of the output of said separate amplifier means appear as the output of said linear product means, gating means for the gating of said combined signals at a prescribed range, analyzing means to analyze said gated signals for frequency content, azimuth responsive signal generating means, display means for displaying said analyzed signals with respect to said azimuth signals.

References Cited by the Examiner
UNITED STATES PATENTS

| | | | |
|---|---|---|---|
| 2,455,639 | 12/48 | Anderson | 343—8 |
| 2,669,710 | 2/54 | Sherr | 343—8 |
| 3,121,856 | 2/64 | Finney | 343—9 |

CHESTER L. JUSTUS, *Primary Examiner.*